Figure 1:
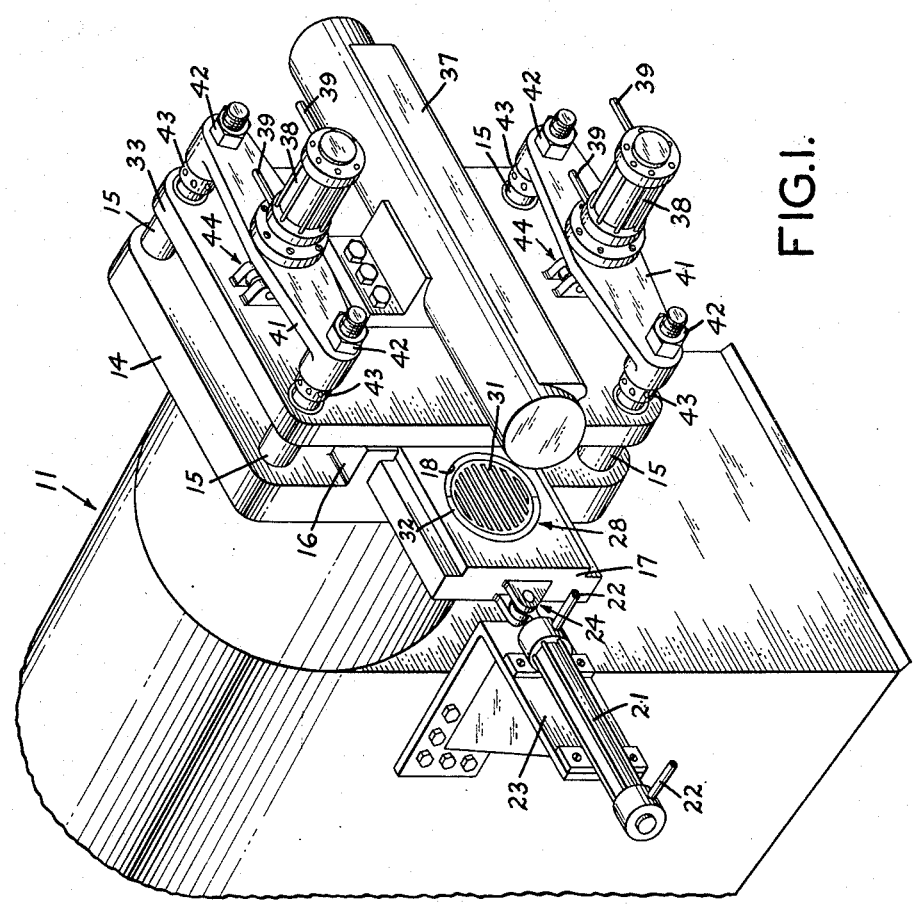

Dec. 8, 1953  J. N. BIRMINGHAM  2,661,497
EXTRUSION APPARATUS
Filed April 3, 1951  2 Sheets-Sheet 1

INVENTOR.
JOHN N. BIRMINGHAM
BY
ATTORNEYS.

Dec. 8, 1953  J. N. BIRMINGHAM  2,661,497
EXTRUSION APPARATUS

Filed April 3, 1951  2 Sheets-Sheet 2

INVENTOR.
JOHN N. BIRMINGHAM
BY
ATTORNEYS.

Patented Dec. 8, 1953

2,661,497

UNITED STATES PATENT OFFICE 2,661,497

EXTRUSION APPARATUS

John N. Birmingham, Nutley, N. J., assignor to Celanese Corporation of America, New York, N. Y., a corporation of Delaware Application April 3, 1951, Serial No. 218,991

6 Claims. (Cl. 18—12)

This invention relates to extrusion apparatus and relates more particularly to a novel changing mechanism for the filter assembly in an extrusion apparatus.

The type of extrusion apparatus generally employed for the extrusion of thermoplastic materials, such as rubber, plastics and the like, comprises an extruder provided with a barrel containing a rotating worm, a feed section at one end of the extruder and an extrusion die operatively connected to the other or output end of the extruder. The extrusion die is usually attached to a heavy plate which is hinged on and bolted to another heavy plate welded to the output end of the extruder barrel. Positioned between these two plates, and held in place by means of bolts squeezing the plates together, is a filter assembly comprising a breaker plate and, generally, a number of screens of different mesh. The breaker plate is a heavy, perforated steel plate which acts as a supporting member for the relatively thin screens.

The screens in operation filter out from the thermoplastic material foreign particles and lumps of unconverted thermoplastic material. As a result, the screens gradually become clogged and offer an increased resistance to the flow of the thermoplastic material therethrough. Eventually this resistance increases to the point where it is no longer practical to operate the extrusion apparatus because of the decreased output or because of the degradation of the quality of the product. When this occurs, it is necessary to remove and replace the filter assembly which is a laborious and time consuming operation. As the first step in replacing the filter assembly, any take-off equipment positioned in front of the extrusion apparatus to receive the product therefrom must be moved to provide sufficient space for the plate carrying the extrusion die to be swung open. Then, the bolts securing this plate to the extruder are loosened and the plate swung open. The clogged filter assembly is then removed and a clean filter assembly inserted in its place, following which the plate carrying the extrusion die is swung to the closed position and bolted tight. The take-off equipment is again brought into position in front of the extruder and, because misalignment of this equipment cannot be tolerated in many cases, must often be very accurately aligned with the extrusion die. At times, the removal and replacement of the filter assembly in an extrusion apparatus takes several hours for a skilled operator, during all of which time the extrusion apparatus is out of production.

It is an important object of this invention to provide an extrusion apparatus which will be free from the foregoing and other disadvantages, and which will be especially simple in construction and efficient in operation.

A further object of this invention is to provide a novel changing mechanism for the filter assembly in an extrusion apparatus.

Other objects of this invention, together with certain details of construction and combinations of parts, will be apparent from the following detailed description and claims.

According to the present invention, there is provided, in an extrusion apparatus, holding means for supporting two filter assemblies and means for shifting said holding means to bring one or the other of the filter assemblies into the path of the thermoplastic material flowing from the extruder to the extrusion die. In addition, means are provided for releasably but firmly clamping the filter assembly, through which the thermoplastic material is flowing, between the extruder and the extrusion die so as to prevent leakage of any of the thermoplastic material therebetween. While the thermoplastic material is flowing through one of the filter assemblies in the holding means, the other filter assembly in said holding means may be removed and replaced. Then, when the filter assembly in use becomes clogged, it is simply necessary to release the clamping means, shift the holding means to bring the other filter assembly in said holding means into the path of the thermoplastic material and reengage the clamping means to put the extruder into condition for further operation. The clogged filter assembly may then be removed and replaced at leisure. Advantageously, hydraulic means are employed both for shifting the holding means carrying the filter assemblies and for releasably clamping the filter assembly between the extruder and the extrusion die, it having been found that hydraulic means operate rapidly and enable the desired forces to be attained readily. It is to be understood, however, that in place of the hydraulic means electrical, mechanical or other suitable means may be employed to perform one or both of these operations.

Figure 2:
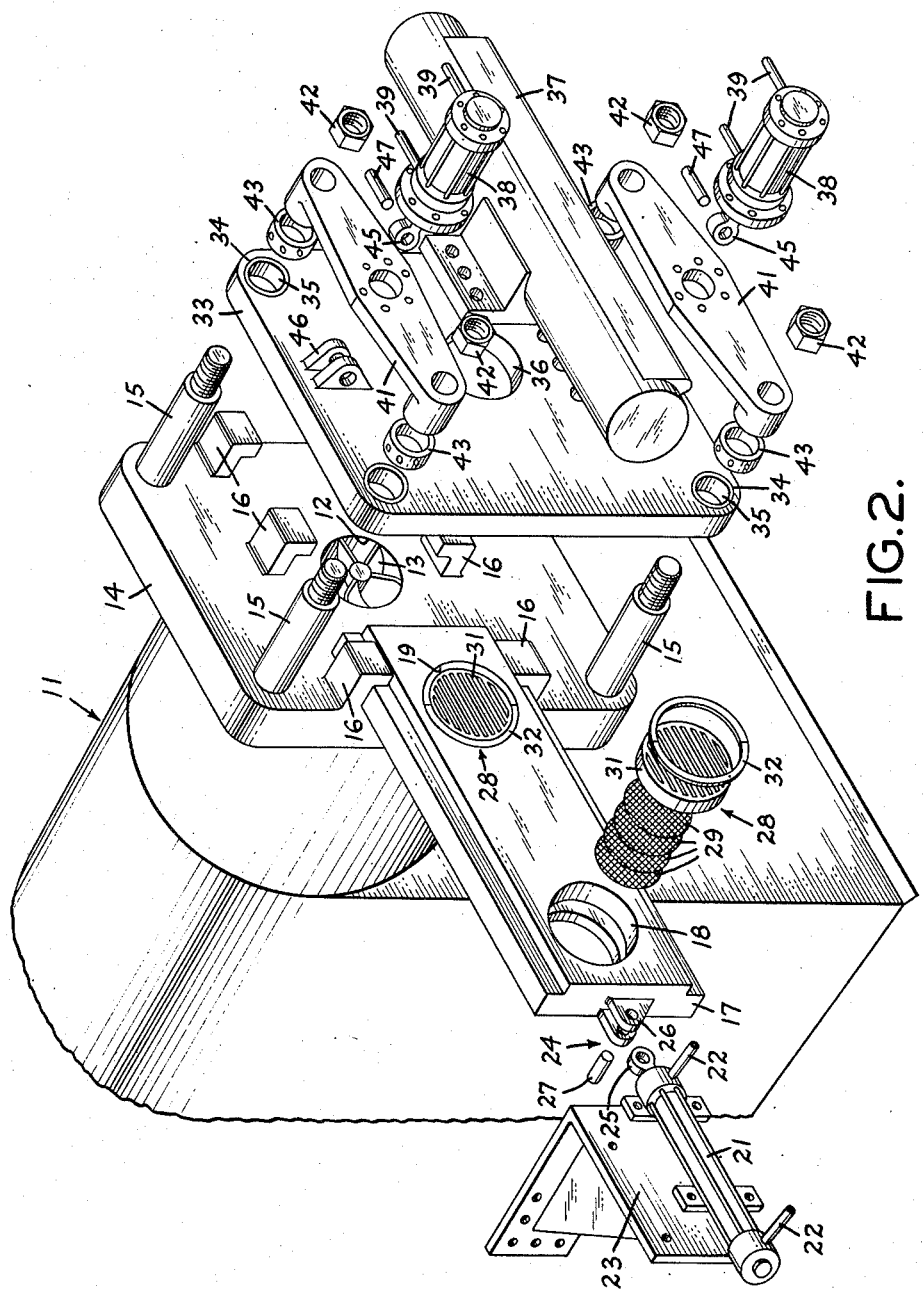

A preferred embodiment of the apparatus of this invention is shown in the accompanying drawings wherein Fig. 1 is a perspective view of a portion of the extrusion apparatus showing the changing mechanism for the filter assembly, and Fig. 2 is an exploded perspective view of the portion of the extrusion apparatus shown in Fig. 1.

Referring now to the drawings, the reference numeral 11 designates generally an extruder having an extruder barrel 12 in which is positioned a positively driven worm 13. Secured to the front or output end of the extruder barrel 12 is a plate 14, to the corners of which are fastened a plurality of dowels 15 and which is provided on its front face with a plurality of guide blocks 16. A slide 17, having apertures 18 and 19 extending therethrough, is mounted in the guide blocks 16 and may be moved to bring either of the apertures 18 and 19 into alignment with the extruder barrel 12 by means of a hydraulic cylinder 21 to which a fluid is supplied under pressure through conduits 22. The hydraulic cylinder 21 is mounted on a bracket 23 which is fastened to the extruder 11 and said cylinder is operatively connected to the slide 17 by means of a coupling 24 comprising an eye 25 and a pad eye 26 through which a pin 27 extends. Fitted into the apertures 18 and 19 are filter assemblies, indicated generally by reference numeral 28, each comprising a plurality of screens 29, a breaker plate 31 and a retaining ring 32.

A plate 33 having a plurality of apertures 34, which are lined with bushings 35, is mounted slideably on the dowels 15. The plate 33 is provided with an aperture 36 which is in alignment with the extruder barrel 12. Fastened to the plate 33, in communication with the aperture 36, is an extrusion die 37 for shaping the extruded thermoplastic material to any desired form, the extrusion die shown in the drawings being intended for the production of sheeting.

The plate 33 is urged toward the plate 14, to hold the slide 17 clamped firmly therebetween, by means of a pair of hydraulic cylinders 38 to which fluid is supplied under pressure through conduits 39. The hydraulic cylinders 38 are mounted on strongbacks 41 fastened to the threaded ends of the dowels 15 by means of nuts 42. Stops 43 are positioned on each of the dowels 15 between the plate 33 and the strongbacks 41 to limit the movement of said plate as will be described more fully hereinafter. The hydraulic cylinders 38 are operatively connected to the plate 33 by means of couplings 44, each comprising an eye 45 and a pad eye 46 through which a pin 47 extends.

In normal operation, the extrusion apparatus may be arranged as shown in Fig. 1 of the drawings with the slide 17 positioned to align the aperture 19 therein with the end of the extruder barrel 12 and with the termoplastic material flowing to the extrusion die 37 through the filter assembly 28 positioned in the said aperture 19. In this position, the filter assembly 28 positioned in the aperture 18 is readily accessible for removal and replacement. When the filter assembly 28 in the aperture 19 becomes clogged to such an extent that replacement thereof is necessary, the extruder 11 is stopped and the hydraulic cylinders 38 are actuated to draw the plate 33 away from the plate 14 until it contacts the stops 43. Then, the hydraulic cylinder 21 is actuated to move the slide 17 to the right (Fig. 1) until the aperture 18 is in alignment with the end of the extruder barrel 12 at which time the aperture 19 will be positioned clear of and to the right of the plates 14 and 33. The hydraulic cylinders 38 are then actuated again to urge the plate 33 toward the plate 14 until the slide 17 is once more clamped firmly between said plates.

The extruder can now be started up again, with the thermoplastic material flowing to the extrusion die 37 through the filter assembly 28 positioned in the aperture 18. The clogged filter assembly 28 in the aperture 19, on the other hand, is readily accessible and may be removed and replaced at leisure with a clean filter assembly.

The apparatus of this invention not only reduces to a minimum down time of the extruder during changes of the filter assembly, but also permits said changes to be economically made more frequently. As a result, the throughput of the extruder may be increased significantly since the extrusion rate through a clean filter assembly is materially higher than that through a partially clogged filter assembly.

It is to be understood that the foregoing detailed description is given merely by way of illustration and that many variations may be made therein without departing from the spirit of my invention.

Having described my invention, what I desire to secure by Letters Patent is:

1. In an extrusion apparatus for the shaping of thermoplastic material, the combination with an extruder and an extrusion die, of a plate fastened to the output end of the extruder, a second plate operatively connected to the extrusion die positioned parallel to and spaced from said first plate, holding means positioned between said plates for supporting two filter assemblies, means for shifting said holding means between said plates for selectively bringing one of said filter assemblies into the path of the thermoplastic material flowing from the extruder to the extrusion die, and means for releasably urging said plates toward each other for clamping said holding means and preventing the leakage of thermoplastic material therebetween and for moving one of said plates away from the other to free said holding means from the clamping action of said plates.

2. In an extrusion aparatus for the shaping of thermoplastic material, the combination with an extruder and an extrusion die, of a plate fastened to the output end of the extruder, a second plate operatively connected to the extrusion die positioned parallel to and spaced from said first plate, holding means positioned between said plates for supporting two filter assemblies, hydraulic means for shifting said holding means between said plates for selectively bringing one of said filter assemblies into the path of the thermoplastic material flowing from the extruder to the extrusion die, and hydraulic means for releasably urging said plates toward each other for clamping said holding means therebetween and preventing the leakage of thermoplastic material and for moving one of said plates away from the other to free said holding means from the clamping action of said plates.

3. In an extrusion apparatus for the shaping of thermoplastic material, the combination with an extruder and an extrusion die, of a plate fastened to the output end of the extruder, dowels fastened to the front of said plate, a second plate operatively connetced to the extrusion die slideably mounted on said dowels and positioned parallel to and spaced from said first plate, holding means slideably positioned between said plates for supporting two filter assemblies, means for shifting said holding means between said plates for selectively bringing one of said filter assemblies into the path of the thermoplastic material flowing from the extruder to the extrusion die, and means for releasably urging said plates toward each other for clamping said holding means therebetween and preventing the leakage of thermoplastic material and for moving one of said plates away from the other to free said holding means from the clamping action of said plates.

4. In an extrusion appearatus for the shaping of thermoplastic material, the combination, with an extruder and an extrusion die, of a plate fastened to the output end of the extruder, dowels fastened to the front of said plate, a second plate operatively connected to the extrusion die slideably mounted on said dowels and positioned parallel to and spaced from said first plate, guide blocks fastened to the front of said first plate, a slide for supporting two filter assemblies mounted in said guide blocks between said plates, means for shifting said slide for selectively bringing one of said filter assemblies into the path of the thermoplastic material flowing from the extruder to the extrusion die, and means for releasably urging said plates toward each other for clamping said holding means therebetween and preventing the leakage of thermoplastic material and for moving one of said plates away from the other to free said holding means from the clamping action of said plates.

5. In an extrusion apparatus for the shaping of thermoplastic material, the combination with an extruder and an extrusion die, of a plate fastened to the output end of the extruder, dowels fastened to the front of said plate, a second plate operatively connected to the extrusion die slideably mounted on said dowels and positioned parallel to and spaced from said first plate, guide blocks fastened to the front of said first plate, a slide for supporting two filter assemblies mounted in said guide blocks between said plates, means for shifting said slide for selectively bringing one of said filter assemblies into the path of the thermoplastic material flowing from the extruder to the extrusion die, strongbacks mounted on said dowels, and means carried by said strongbacks and operatively connected to said second plate for releasably urging said plates toward each other for clamping said holding means therebetween and preventing the leakage of thermoplastic material.

6. In an extrusion apparatus for the shaping of thermoplastic material, the combination with an extruder and an extrusion die, of a plate fastened to the output end of the extruder, dowels fastened to the front of said plate, a second plate operatively connected to the extrusion die slideably mounted on said dowels and positioned parallel to and spaced from said first plate, guide blocks fastened to the front of said first plate, a slide for supporting two filter assemblies mounted in said guide blocks between said plates, a hydraulic cylinder operatively connected to said slide for shifting said slide for selectively bringing one of said filter assemblies into the path of the thermoplastic material flowing from the extruder to the extrusion die, strongbacks mounted on said dowels, and hydraulic cylinders carried by said strongbacks and operatively connected to said second plate for releasably urging said plates toward each other for clamping said slide therebetween and preventing the leakage of thermoplastic material.

JOHN N. BIRMINGHAM.

References Cited in the file of this patent

UNITED STATES PATENTS

| Number | Name | Date |
| --- | --- | --- |
| 642,813 | Cowen | Feb. 6, 1900 |
| 2,291,212 | Clinefelter | Feb. 28, 1942 |

FOREIGN PATENTS

| Number | Country | Date |
| --- | --- | --- |
| 774,212 | France | Sept. 17, 1934 |